US005775517A

United States Patent [19]

Speck

[11] Patent Number: 5,775,517

[45] Date of Patent: Jul. 7, 1998

[54] SUPPORTING FRAME

[75] Inventor: Ulrich Speck, Ludwigsburg, Germany

[73] Assignee: LTG Lufttechnische Gesellschaft mit beschränkter Haftung, Stuttgart, Germany

[21] Appl. No.: 812,674

[22] Filed: Mar. 10, 1997

[30] Foreign Application Priority Data

Mar. 8, 1996 [DE] Germany ........................ 196 09 023.7

[51] Int. Cl.$^{6}$ ........................ B65G 17/00

[52] U.S. Cl. ........................ 211/41.1; 198/803.13; 198/803.14

[58] Field of Search ........................ 211/41.1, 41.4, 211/181.1, 121, 122; 198/803.13, 803.14

[56] References Cited

U.S. PATENT DOCUMENTS

| | | | |
|---|---|---|---|
| 2,316,177 | 4/1943 | Melzer | 198/134 |
| 2,338,015 | 12/1943 | Whitaker | 198/803.13 |
| 2,821,286 | 1/1958 | Russell | 198/803.13 |
| 3,572,497 | 3/1971 | Karpac et al. | 198/803.14 |
| 5,071,305 | 12/1991 | Curti | 414/157 |
| 5,213,196 | 5/1993 | Wolf | 198/803.13 X |

FOREIGN PATENT DOCUMENTS

| | | |
|---|---|---|
| 1239244 | 4/1967 | Germany . |
| 2403671 | 8/1975 | Germany . |
| 3816601 | 3/1989 | Germany . |
| 4022411 | 1/1992 | Germany . |
| 4139812 | 6/1993 | Germany . |
| 4200500 | 12/1993 | Germany . |
| 9406152 | 9/1994 | Germany . |
| 4339092 | 10/1995 | Germany . |

*Primary Examiner*—Robert W. Gibson, Jr.
*Attorney, Agent, or Firm*—Darby & Darby

[57] ABSTRACT

The invention is directed to a supporting frame, in particular for a transporting device for transporting flat, preferably surface-coated objects. The supporting frame has a plurality of web parts which are welded together to form a receiving surface for the transported objects. A first web part has a cross-sectional profile having at least one bead which projects above a fastening surface for fastening to a second web part. The bead provides an alignment guide during assembly of the web parts so that none of the web parts protrude above the receiving surface of the support frame. The bead also prevents excess welding materials from protruding above the receiving surface of the support frame. By preventing protrusions of web parts and welding materials above the receiving surface of the support frame, damage to objects transported on the support frame is avoided or eliminated. Also, all terminating ends of the second web parts are connected with the first web part and there are no web parts or portions thereof extending at right angles to the feed direction of the objects, further avoiding or eliminating damage to the objects transported.

8 Claims, 3 Drawing Sheets

SUPPORTING FRAME

FIELD OF THE INVENTION

The invention is directed to a supporting frame, in particular for a transporting device for transporting flat, preferably surface-coated objects, with a plurality of web parts which are welded together.

BACKGROUND OF THE INVENTION

Supporting frames of the type mentioned above are known. They are accommodated in large quantities in a belt-section type transporting device and serve especially to receive surface-coated objects, for example, lacquered or printed metal sheet panels, and to transport them, for example, through a drying oven. In order to prevent damage to the surface coatings it is necessary for the objects to contact the respective supporting frame over as large a surface area as possible. Point contact and the like which could occur, for example, due to protruding corners or edges resulting from an inexact fit when the web parts are welded together is especially disadvantageous. Also, any welding beads or globules which may occur as a result of the welding together of the web parts must be eliminated in the course of finishing or after treatment so as to avert the risk of damage mentioned above. The known supporting frames are formed of a plurality of individual parts which leads to relatively high production costs.

Therefore, the object of the present invention is to provide a supporting frame of the type mentioned above which makes it possible to transport objects securely and without damaging the objects and which can be produced in a simple and economical fashion.

SUMMARY OF THE INVENTION

This object is met in accordance with the invention in that at least a (first) web part has a cross-sectional profile having at least one flange or bead which projects above a fastening surface for fastening to another (second) web part. Accordingly, in accordance with the invention, at least one web part of the supporting frame is produced from a section or profile which has—considered in cross section—a bead lateral to a fastening surface. This fastening surface is the contact surface of two adjoining web parts, these two web parts being welded together in the region of the fastening surface. Welding is preferably effected by spot welding. In particular, one web part is provided with embossed or stamped protuberances or noses which—during the electric welding process—contact the other web part, melt, and in this way produce the bond. Since material which has been melted on during the welding process can spatter and remain on the supporting frame as weld globules, there is a risk that these weld globules will project in a troublesome manner above the receiving surface for receiving the objects and cause damage to surfaces as was mentioned above. However, since the one web part has the bead projecting above the fastening surface according to the invention, it is ensured that material which is spattered in this way will be deflected by the bead; that is, as a result of the deflecting movement, it is oriented in a direction such that it will not project above the receiving surface and accordingly cannot lead to damage during transporting of the objects. Further, the bead brings about a mechanical stiffening so that the supporting frame obtains extensive stiffness in spite of its light weight and thus has a reduced tendency toward vibrations and the like in the transporting device, which is likewise advantageous for the sensitive coated objects. Moreover, the mechanical stiffening due to the bead has the advantage that the "doubling" of web parts, as is conventional in the prior art, can be dispensed with. By "doubling" is meant the welding together of two web parts which are identically constructed at least in some areas in order to double the cross section and accordingly achieve a greater mechanical strength. The word "bead" is used throughout this Application to describe the cross-sectional configuration of the first web part. By "bead" is meant any cross-sectional configuration which includes a profile web protruding in the manner of a nose, wherein this web can have a rounded or cornered cross-sectional contour.

According to a further development of the invention, the first web part has at least two beads forming therebetween a receiving groove for the second web part. Further, the receiving groove is advantageous in that a skewed or inaccurately positioned welding together of web parts cannot occur because the receiving groove performs a guiding function. Accordingly, an end part of a web is prevented from projecting above the receiving surface when the web parts are welded together.

As a result of this cross-sectional configuration, a reproducible, accurately positioned fastening of the corresponding web parts relative to one another is made possible in a particularly simple manner, since the receiving groove aligns or orientates the web parts relative to one another. Further, the groove walls belonging to the two beads prevent material from exiting during the spot welding process in a direction such that troublesome weld globules or the like could result.

It is further advantageous that the first web part has an H-shaped cross-sectional profile. As a result of this, a receiving groove is formed on both sides of the web part so that other second web parts can be welded on at both sides in a simple manner.

Two lateral web parts are preferably provided which, in particular, are constructed so as to extend in a straight line at a distance from one another. These lateral web parts are fastened to the transporting device by one end region and, owing to their profiling, form the essential carrying parts of the wire frame. Second web parts are welded in between them, thereby forming the receiving surface. Support loops can be welded on at the other respective sides of the H-shaped cross-sectional profiles so that the receiving surface is considerably enlarged.

The second profile part preferably has a substantially rectangular cross section so that it can be introduced into the receiving groove of the first web part in an optimum manner. "Rectangular" does not necessarily denote a strictly geometrical rectangular cross-section contour, but rather can also denote contours with rounded corners or curved sides, e.g., of oppositely located end faces.

Finally, it is advantageous that the fastening surface extends transversely, in particular, at right angles, to the object receiving surface. Due to this orientation, it is always ensured on the one hand that the mechanical stiffening is effective and, on the other hand, a deflection of weld globules is guaranteed so that these do not project above the receiving surface.

It is particularly advantageous that the end regions of all second web parts are welded with the first web parts. Owing to the profiling, in particular the receiving groove, of the first web parts, it is ensured that the ends of the second web parts will not be connected on a slant with the first web parts such that projecting edges and the like are formed. Rather, the receiving groove forms a corresponding guide which prevents the occurrence of such projecting edges and the like during production so that the objects to be received are safeguarded against scratching.

Further, it is advantageous that the construction of the supporting frame according to the invention is effected in such a way that there is a continuous line orientation of the structural component parts which results on the one hand from the end regions of the second web part being fastened to the first web parts, as was already mentioned, and also from the fact that only continuous parts are connected, especially welded, together in the central region of the supporting frame, since the ends are connected with the first web parts as was mentioned above. In the event that an unwanted offset between portions of two interconnected web parts lying in the central region is effected during production, this does not lead to projecting ends but rather, owing to the continuous line orientation, does not adversely affect the careful transport of the flat objects. However, it should be made clear in this connection that the normal (defect-free) constructional shape provides that the adjoining, interconnected portions of the inner web parts extend flush with one another, that is, are not offset relative to one another.

It is further suggested, in accordance with a particularly preferred embodiment example of the supporting frame, that no web part or portion thereof extends at a right angle to the transporting direction when introducing the sheet panels. When the sheet panels or flat objects are introduced, the supporting frame is in a roughly horizontal position. The object to be introduced is then moved in the direction of the longitudinal dimension of the first web parts or approximately in that direction. Since none of the web parts forms a right angle, the objects are prevented from interlocking or stick-slipping, which spares the surfaces of the objects.

The invention is illustrated in the drawings with reference to embodiment examples.

DETAILED DESCRIPTION OF THE INVENTION

Figure 1:
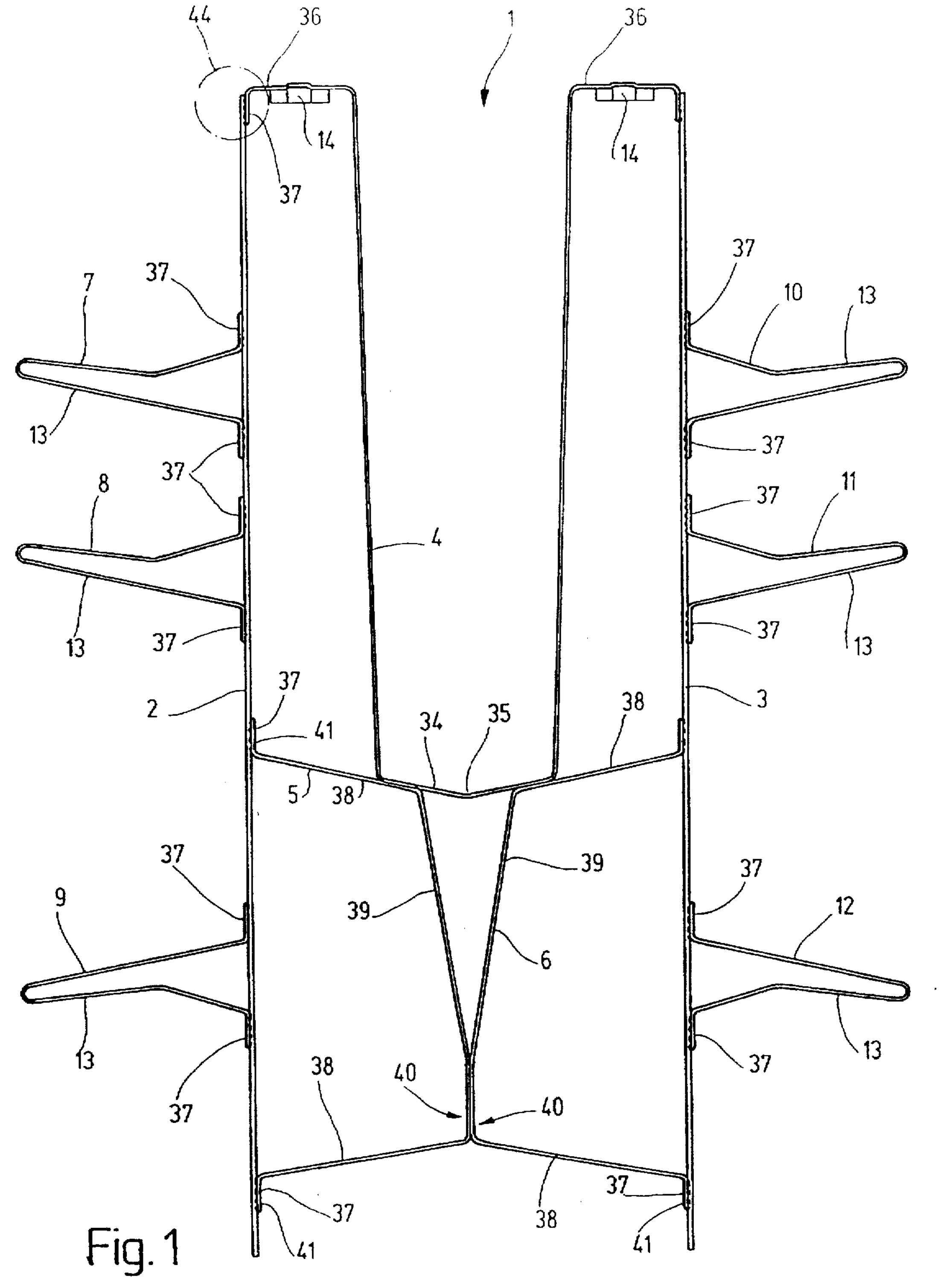
FIG. 1 shows a wire frame.
Figure 2:
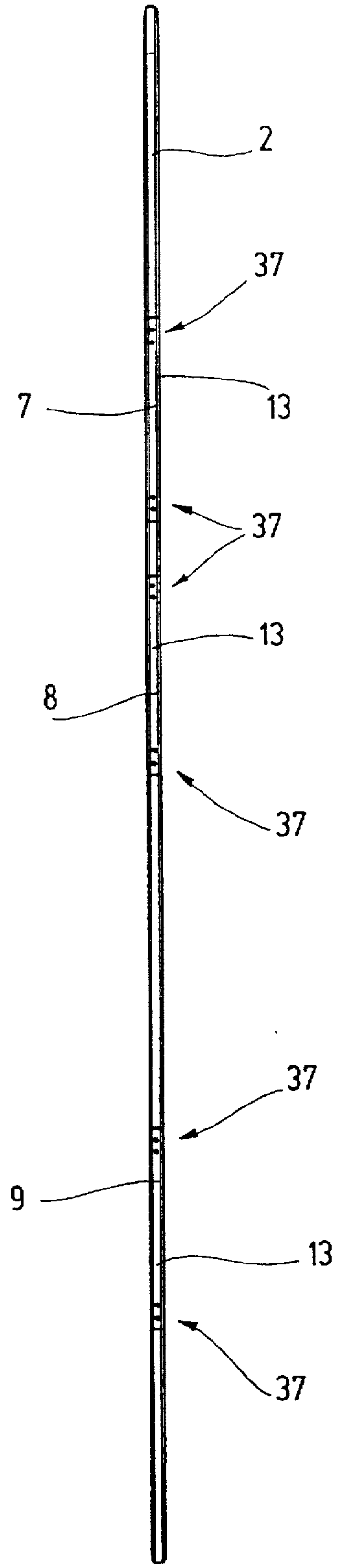
FIG. 2 shows a side view of the wire frame shown in FIG. 1.

FIG. 1 shows a top view of a supporting frame 1 which has web parts 2 and 3 forming first web parts. Further, the supporting frame 1 has web parts 4, 5 and 6 which form second web parts. Also provided are web parts 7 to 12 which form second web parts and are constructed as support loops 13. Further, the supporting frame 1 has two spacers 14 which will not be discussed at greater length hereinafter as they are not essential to the invention.

Figure 6:
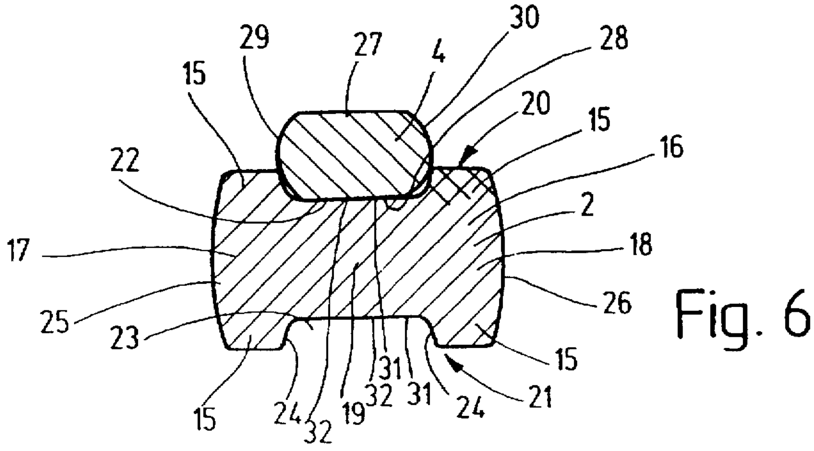
FIG. 6 shows a cross section through the connection zone of FIGS. 4 and 5, respectively.

The first web parts 2, 3, as shown in FIG. 6, are so profiled in cross section that at least one bead 15 is formed, this bead 15 being formed integral with the web part, and is shown by cross-hatching in FIG. 6 for greater clarity. The first web part 2, 3 preferably has an H-shaped cross-sectional profile 16 as is shown in FIG. 6. The H-shaped contour gives two side webs 17, 18 which are connected with one another in one piece via a cross-web 19. A receiving groove 22, 23 is accordingly formed on the upper side 20 and on the underside 21, respectively. The side walls 24 of each receiving groove 22, 23 form a side wall of the associated bead 15, wherein the upper side 20 and underside 21 form the respective top of the associated bead 15, and a portion of the side surface 25 and 26 of the side webs 17 and 18 forms another side region of the respective bead 15. The side surfaces 25 and 26 are spherical so that the objects received on the supporting frame make contact without being damaged.

As will be seen from FIG. 1, the two web parts 2 and 3 are constructed so as to run in a straight line and extend roughly parallel to one another and at a distance from one another. The web parts 4 to 6 are arranged between the two web parts 2 and 3. The support loops 13 are located on the other side of the web parts 2 and 3, wherein web parts 7 to 9 are associated with web part 2 and web parts 10 to 12 are associated with web part 3.

As shown in FIG. 6, the second web parts 4 to 12 have a substantially rectangular cross-sectional profile. Web part 4 is shown in this figure by way of example. It has two plane sides 27, 28 extending parallel to one another and two curved sides 29, 30. According to another embodiment example, not shown, it can be provided that only one side, e.g., side 28, is planar and thus side 27 has any desired contour. One planar side is sufficient; specifically, only the side required for the connection to the first web parts need be planar. The dimension between end sides 29 and 30 corresponds—within defined tolerances—to the width of the receiving groove 22, 23 so that an accurately positioned arrangement according to FIG. 6 is made possible in a simple manner. It will be seen that when the first and second web parts are joined a fastening surface 31 is formed, that is, the contact surface between the two said parts. In FIG. 6, the fastening surface 31 is formed by the contacting of the side 28 at the base 32 of the receiving groove 22. As will be seen from FIG. 6, a bead 15 is located on each side of this fastening surface 31 and rises above the fastening surface.

FIG. 1 shows that the second web part 4 has an approximately U-shaped center part 33, the lower U-shaped web 34 having a bend 35, so that the lower U-shaped web 34 extends at obtuse angles. At the upper ends of the "U", cross-webs 36 are bent roughly at 90-degree angles. Connection webs 37 are bent away from the latter in turn, these connection webs 37 extending approximately parallel to the legs of the U. The fastening of the connection webs 37 to the first web parts 2, 3 follows from FIGS. 4 and 5. This will be discussed in more detail hereinafter.

The second web parts 5 and 6 are configured in a mirror-inverted manner relative to one another; therefore, the following discussion will be restricted to web part 5. It is roughly U-shaped with two U-legs 38 and a base web 39. The base web 39 is slightly angled in one end region so that there is a contact zone 40 with the adjacent web part 6. The two free ends 41 of the U-legs 38 likewise form connection webs 37 which are connected with the web profile 2. The upper U-leg 38 of the web part 5, with reference to FIG. 1, is connected with a portion of the U-shaped web 34.

The support loops 13 are loop-shaped and each of them has an angled connection web 37 at the end by which they are attached to web parts 2 and 3, respectively.

Figure 3:
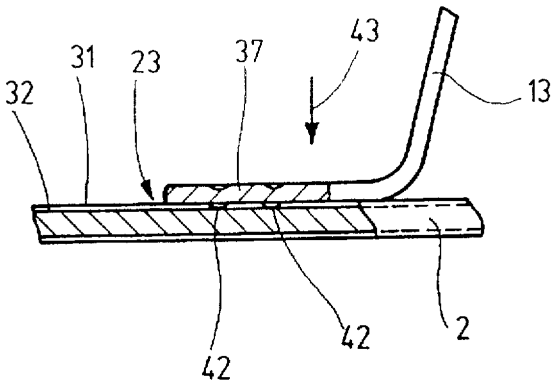
FIG. 3 shows a connection zone of two web parts belonging to the supporting frame prior to the welding process.

FIG. 3 shows the connection zone of a first and a second web part, e.g., the connection web 37 of a support loop 13 and the web part 2. FIG. 3 shows the situation before said parts are welded. The connection web 37 is provided with stamped noses 42 which were formed by a spot stamping process in the direction of the arrow 43 shown in FIG. 3. In order to join the support loop 13 and web part 2, the connection web 37 is introduced into the corresponding receiving groove 23 so that the stamped noses 42 rest on the base 32 or fastening surface 31. The welding contacts of a welding machine, not shown, are connected with the parts to be joined and the connection web 37 is pressed completely into the receiving groove 23. The material of the stamped noses 42 melts and a firm weld connection is formed. As will be seen from FIG. 6, welding material which may possibly spatter toward the side cannot reach the side surfaces 25 or 26 and, in particular, cannot overlap these side surfaces 25, 26, since the spattering material is deflected by the side walls 24 of the groove.

Figure 4:
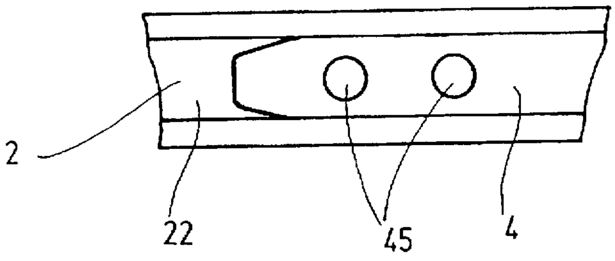
FIG. 4 shows a top view of a connection zone.
Figure 5:
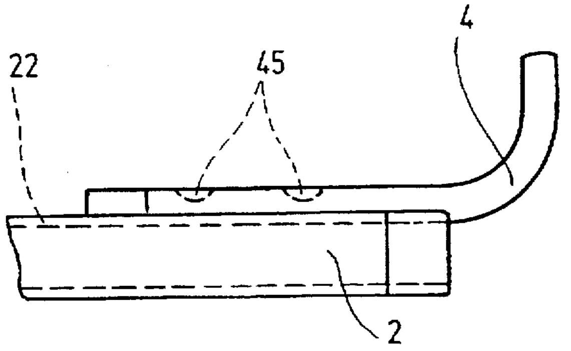
FIG. 5 shows a side view of the connection zone from FIG. 4.

FIGS. 4 and 5 show the connection zone between web part 2 and web part 4. This connection zone is indicated in FIG. 1 by a circle 44 drawn in dashes. Here again it will be seen that the substantially rectangular profile of the second web part 4 is also inserted in the receiving groove 22 of the first web part 2 so as to be accurately positioned and the connection is produced by means of spot welds 45 as was described above.

Another embodiment example of a supporting frame which is not illustrated in the drawings will now be discussed. This embodiment example differs only in several details from the embodiment example shown in FIG. 1, so that only the differences will be discussed. These differences consist in that the upper U-legs 38 of the supporting parts 5 and 6 do not extend in a straight line as in the embodiment example shown in FIG. 1, but rather have a bend 46, wherein the free end 41 is angled downward instead of upward as in FIG. 1.

What is claimed is:

1. A supporting frame for a transporting device, for transporting flat objects, comprising first and second web parts forming a receiving surface for said objects, said first web part having a fastening surface for fastening to said second web part by welding, said first web part having a first bead which projects above said fastening surface.

2. The supporting frame according to claim 1, wherein the first web part has a second bead opposite said first bead, said second bead projecting above said fastening surface, said first and second beads and said fastening surface forming a receiving groove therebetween, said receiving groove for receiving said second web part.

3. The supporting frame according to claim 2, wherein said first web part has an H-shaped cross-sectional profile, legs of said H-shaped cross-sectional profile forming opposite pairs of said first and second beads respectively.

4. The supporting frame according to claim 1, wherein said first web part comprises a pair of spaced apart side web parts, said side web parts extending in a straight line.

5. The supporting frame according to claim 1, wherein the second web part has a substantially rectangular cross-sectional profile.

6. The supporting frame according to claim 1, wherein said fastening surface is oriented at a right angle to the object receiving surface.

7. The supporting frame according claim 1, wherein said second web part has opposite terminating ends, said terminating ends connected to said first web part.

8. The supporting frame according to claim 1, wherein said objects have a feed direction relative to said transporting device, and all portions of said first and second web parts are oriented at an angle other than a right angle to said feed direction.

* * * * *